United States Patent
Griffin et al.

(10) Patent No.: US 11,212,454 B2
(45) Date of Patent: Dec. 28, 2021

(54) SATURATION AVOIDANCE IN DIGITAL IMAGING

(71) Applicant: Bio-Rad Laboratories, Inc., Hercules, CA (US)

(72) Inventors: Michael Griffin, El Cerrito, CA (US); Stephen Swihart, Walnut Creek, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 16/597,665

(22) Filed: Oct. 9, 2019

(65) Prior Publication Data

US 2020/0120256 A1 Apr. 16, 2020

Related U.S. Application Data

(60) Provisional application No. 62/745,610, filed on Oct. 15, 2018.

(51) Int. Cl.
*H04N 5/235* (2006.01)

(52) U.S. Cl.
CPC ......... *H04N 5/2353* (2013.01); *H04N 5/2355* (2013.01)

(58) Field of Classification Search
CPC .... H04N 5/2353; H04N 5/2355; H04N 5/361; H04N 5/2351
See application file for complete search history.

(56) References Cited

U.S. PATENT DOCUMENTS

| 7,492,391 B1* | 2/2009 | Kaplinsky | H04N 5/2355 348/211.3 |
|---|---|---|---|
| 9,160,936 B1 | 10/2015 | Rivard et al. | |
| 2002/0176010 A1* | 11/2002 | Wallach | H04N 5/2355 348/229.1 |
| 2003/0157581 A1* | 8/2003 | Grill | G01N 21/6452 435/8 |
| 2004/0207734 A1* | 10/2004 | Horiuchi | H04N 5/2355 348/229.1 |

(Continued)

OTHER PUBLICATIONS

International Search Report and Written Opinion in PCT/US2019/055455 dated Jan. 6, 2020; 8 pages.

*Primary Examiner* — Jason A Flohre
(74) *Attorney, Agent, or Firm* — Kilpatrick Townsend and Stockton LLP

(57) ABSTRACT

A method of image capture helps avoid saturation in digital imaging. In one implementation, the method includes capturing a first digital image of a target using an electronic array light sensor, and identifying one or more saturated pixels in the first digital image. The method further includes identifying a region of interest in the first digital image, the region of interest encompassing the one or more identified saturated pixels. The method also includes capturing a second digital image of the target using the electronic array light sensor. The second digital image encompasses only the region of interest, and the second digital image is captured with a shorter exposure time than the first digital image. The first and second digital images may be combined into a high dynamic range image. Systems for digital imaging may be based on complementary metal oxide semiconductor (CMOS) or charge coupled device (CCD) sensors.

20 Claims, 15 Drawing Sheets

(56) References Cited

U.S. PATENT DOCUMENTS

| | | | |
|---|---|---|---|
| 2005/0195289 A1* | 9/2005 | Jacobs | H04N 5/3452 348/223.1 |
| 2006/0170662 A1 | 8/2006 | Kurane | |
| 2008/0018767 A1* | 1/2008 | Parks | H04N 5/335 348/311 |
| 2008/0240747 A1 | 10/2008 | Ikami | |
| 2010/0259626 A1* | 10/2010 | Savidge | H04N 5/2355 348/208.4 |
| 2012/0038797 A1* | 2/2012 | Jang | H04N 5/2355 348/241 |
| 2012/0249862 A1* | 10/2012 | Makino | G01N 21/6456 348/362 |
| 2013/0243283 A1* | 9/2013 | Kotchou | G06T 5/008 382/128 |
| 2014/0177913 A1 | 6/2014 | Holz | |
| 2015/0028102 A1* | 1/2015 | Ren | H04N 5/3454 235/454 |
| 2015/0172526 A1* | 6/2015 | Swihart | H04N 5/35545 348/61 |
| 2017/0187938 A1* | 6/2017 | Ichihara | H04N 5/2355 |
| 2019/0342485 A1* | 11/2019 | Lee | H04N 5/2355 |

* cited by examiner

SATURATION AVOIDANCE IN DIGITAL IMAGING

CROSS-REFERENCES TO RELATED APPLICATIONS

The present application claims the benefit of priority to U.S. Provisional Patent Application No. 62/745,610, filed Oct. 15, 2018 and titled "Saturation Avoidance in Digital Imaging", the contents of which are hereby incorporated by reference herein in their entirety for all purposes.

BACKGROUND OF THE INVENTION

Electrophoresis is a technique used in molecular biology and other disciplines to detect the presence of proteins or other analytes in a mixture. Typically, after some preparatory steps, the mixture is placed in "wells" of a gel such as an agarose or polyacrylamide gel. For a protein assay, the gel is subjected to an electric field, which causes the proteins to migrate through the gel. The speed of migration of a particular protein in the mixture through the gel is dependent on the molecular weight of the protein. Proteins having lower molecular weights tend to migrate faster than proteins having higher molecular weights. After a time, the different proteins become separated, since they have traveled different distances through the gel.

The proteins may be tagged with antibodies such that the proteins of interest emit light by chemiluminescence. In some applications, for example in the well-known western blotting technique, the proteins are transferred to a membrane such as a polyvinylidene fluoride (PVDF) or nitrocellulose membrane to form a blot. Historically, (after a few incubation steps) the blot was placed in contact with photographic film of about the same size as the blot. The chemiluminescent light exposed portions of the film, so that the pattern of protein separations was permanently recorded on the film. Recently, electronic imaging is replacing photographic film for this purpose.

Contact imagers have been proposed for reading blot images. In a contact imager, the membrane is placed in contact or effectively in contact with a large semiconductor light sensor such as a CMOS (complementary metal oxide semiconductor) or CCD (charge coupled device) sensor. Light emanated by chemiluminescence reaches the sensor directly, in much the same way as in film-based contact recording. In this method, no shutter or other means is present for blocking light from the sample from reaching the sensor, so the sensor is continuously exposed to chemiluminescent light from the sample. In addition, parts of the blot may emanate much more light than other parts, requiring that the image system have an extremely high dynamic range.

BRIEF SUMMARY OF THE INVENTION

According to one aspect, a method of image capture comprises capturing a first digital image of a target using an electronic array light sensor, and identifying one or more saturated pixels in the first digital image. The method further comprises identifying a region of interest in the first digital image. The region of interest encompasses at least some of the one or more identified saturated pixels. The method further comprises capturing a second digital image of the target using the electronic array light sensor, the second digital image encompassing only the region of interest. The second digital image is captured with a shorter exposure time than the first digital image. In some embodiments, the first digital image encompasses the entire electronic array light sensor, and is read as quickly as possible from the electronic array light sensor. In some embodiments, the region of interest encompasses all of the saturated pixels in the first digital image. In some embodiments, the region of interest encompasses a discrete patch of saturated pixels. In some embodiments, the region of interest encompasses only one of at least two discrete patches of saturated pixels. In some embodiments, the method further comprises assembling a high dynamic range digital image of the target using at least the first and second digital images. In some embodiments, the method further comprises capturing a long-exposure digital image of the target using the electronic array light sensor, the long-exposure digital image being captured with an exposure time longer than the exposure time of the first digital image; and assembling the high dynamic range digital image using at least the first digital image, the second digital image, and the long-exposure digital image. In some embodiments, the region of interest is a first region of interest, and the method further comprises identifying one or more saturated pixels in the second digital image; identifying a second region of interest encompassing at least some of the saturated pixels in the second digital image, the second region of interest being smaller than the first region of interest; and capturing a third digital image of the target using the electronic array light sensor, the third digital image encompassing only the second region of interest, and the third digital image being captured with a shorter exposure time than the second digital image. In some embodiments, the method further comprises assembling a high dynamic range digital image of the target using at least the first digital image, the second digital image, and the third digital image. In some embodiments, the method further comprises capturing a long-exposure digital image of the target using the electronic array light sensor, the long-exposure digital image being captured with a longer exposure time than the first digital image; and assembling a high dynamic range digital image of the target using at least the first digital image and the long-exposure digital image, wherein the second region of interest in the high dynamic range digital image includes data derived from the third digital image. In some embodiments, the region of interest is a first region of interest, and the method further comprises identifying one or more saturated pixels in the second digital image; subdividing the first region of interest into one or more progressively smaller regions of interest; and capturing one or more additional digital images of the one or more progressively smaller regions of interest using progressively smaller exposure times, until a digital image is obtained having no saturated pixels. In some embodiments, the electronic array light sensor is a complementary metal oxide semiconductor (CMOS) sensor, and capturing the second digital image of the target comprises reading fewer than all of the pixels in the electronic array light sensor. In some embodiments, the electronic array light sensor is a complementary metal oxide semiconductor (CMOS) sensor, and capturing at least one of the first digital image and the second digital image comprises the use of a rolling shutter. In some embodiments, the electronic array light sensor is a charge coupled device (CCD) sensor, and capturing the second digital image of the target comprises shifting some charges from the CCD sensor and discarding them without conversion to numerical values. In some embodiments, the electronic array light sensor is a charge coupled device (CCD) sensor, and capturing the second digital image of the target comprises binning of charges in the CCD sensor. In some embodiments, the method further comprises limiting the size of the region of interest in relation to the electronic array light sensor. In some embodiments, the second digital image is captured at a lower resolution than the first digital image.

According to another aspect, an imaging device comprises an electronic array light sensor having a number of pixels, and a controller programmed to control the operation of the electronic array light sensor and to receive signals from the electronic array light sensor indicating the intensity of light falling respectively on the pixels of the electronic array light sensor. The controller is programmed to capture a first digital image of a target using the electronic array light sensor, identify one or more saturated pixels in the first digital image, and identify a region of interest in the first digital image, the region of interest encompassing the one or more identified saturated pixels. The controller is further programmed to capture a second digital image of the target using the electronic array light sensor, the second digital image encompassing only the region of interest, and the second digital image being captured with a shorter exposure time than the first digital image. In some embodiments, the electronic array light sensor is a complementary metal oxide semiconductor (CMOS) sensor or a charged coupled device (CCD) sensor. In some embodiments, the controller is further programmed to construct a high dynamic range digital image of the target using at least the first digital image and the second digital image. In some embodiments, the controller is further programmed to identify one or more saturated pixels in the second digital image; identify a second region of interest encompassing at least some of the saturated pixels in the second digital image, the second region of interest being smaller than the first region of interest; and capture a third digital image of the target using the electronic array light sensor, the third digital image encompassing only the second region of interest, and the third digital image being captured with a shorter exposure time than the second digital image. In some embodiments, the electronic array light sensor comprises multiple taps.

DETAILED DESCRIPTION OF THE INVENTION

Figure 1:
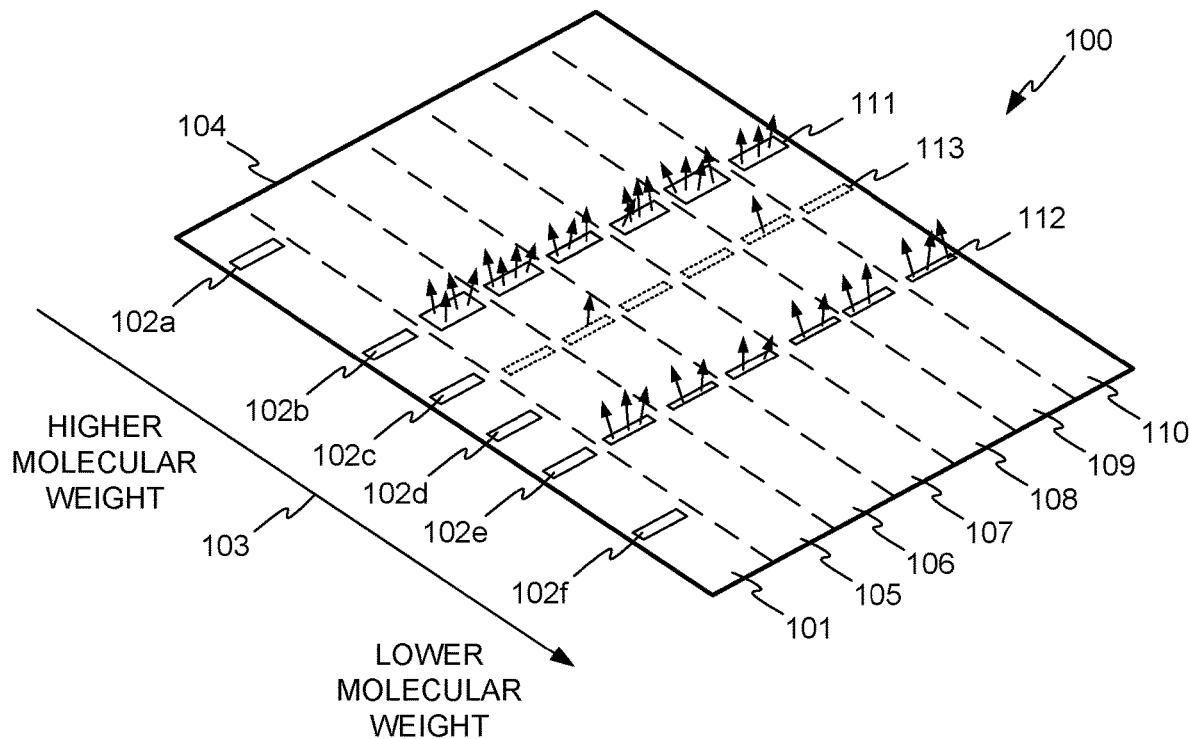
FIG. 1 illustrates a typical blot after separation of proteins, in accordance with embodiments of the invention.

FIG. 1 illustrates a typical blot 100 after separation of proteins, in accordance with embodiments of the invention. One lane 101 of the blot is reserved for protein standards 102a-102f. Protein standards 102a-102f have been separated in direction 103, with lower molecular weight protein standard 102f being farther from edge 104 than higher molecular weight protein standard 102a.

Samples of the mixture to be assayed have been separated in lanes 105-110, resulting in protein bands 111, 112, and 113 in each of lanes 105-110. (The lane divisions shown in dashed lines are for illustration only, and do not appear on a blot.) Protein band 111 emits light strongly, and corresponds approximately to the molecular weight of protein standard 102b. Protein band 112 emits light somewhat less strongly, and corresponds approximately to the molecular weight of protein standard 102e. Protein band 113 corresponds approximately to the molecular weight of protein standard 102c, and emits light very weakly, indicating that very little of the protein in band 113 may be present. Because standards 102b, 102c, and 102e are of known weight, their presence provides information about the molecular weights of the proteins at bands 111, 112, and 113, to assist in identifying the proteins in bands 111, 112, and 113.

As is indicated in FIG. 1, the proteins in bands 111, 112, and 113 are emitting light via chemiluminescence. Protein standards 102a-102f may or may not be chemiluminescent.

Figure 2:
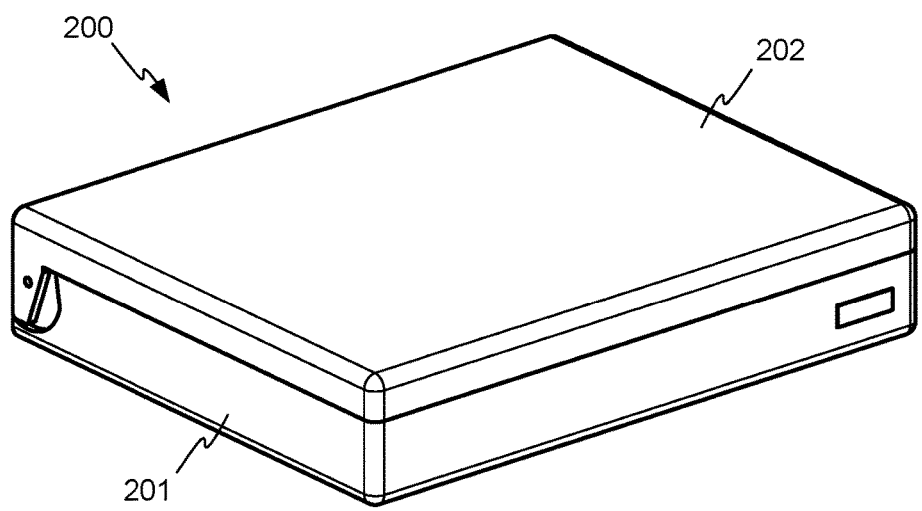
FIG. 2 illustrates an imaging device in accordance with embodiments of the invention, in a closed position.
Figure 3:
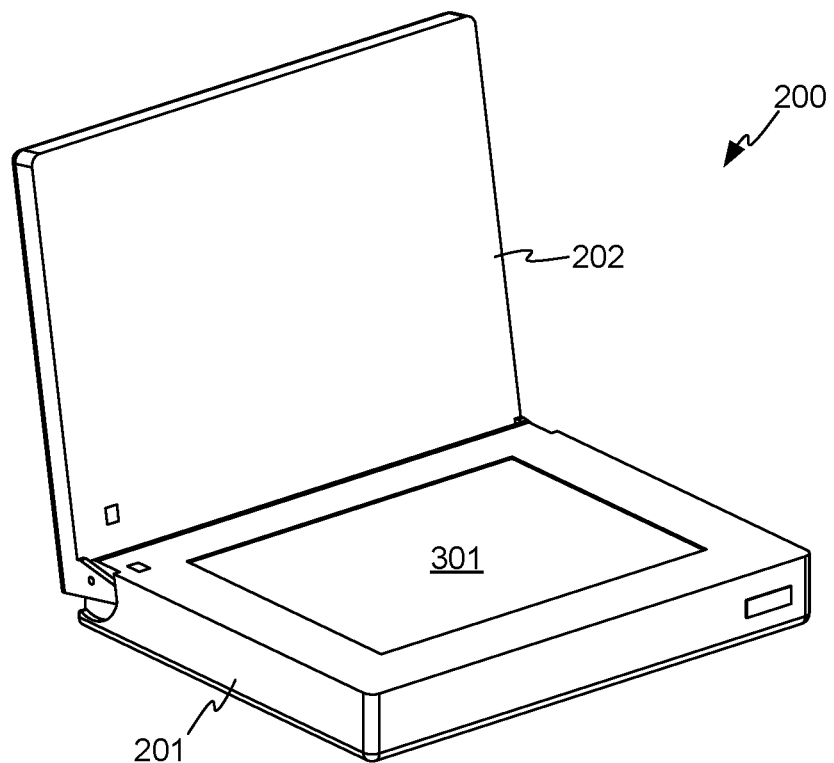
FIG. 3 shows the imaging device of FIG. 2 in an open position.

FIG. 2 illustrates an imaging device 200 in accordance with embodiments of the invention, in a closed position. FIG. 3 shows imaging device 200 in an open position. Referring to both FIG. 2 and FIG. 3, imaging device 200 includes a base portion 201 and a lid 202. Lid 202 is shown in a closed position in FIG. 2, and in an open position in FIG. 3.

A contact area image sensor 301 is disposed in base 201. Contact area image sensor 301 is an example of an electronic array light sensor, and may be, for example, of the kind described in U.S. Patent Application Publication No. 2015/0172526 of Swihart et al., published Jun. 18, 2015 and titled "Non-Destructive Read Operations with Dynamically Growing Images", now U.S. Pat. No. 9,736,388; U.S. Patent Application Publication No. 2016/0006910 of Uri et al., published Jan. 7, 2016 and titled "Contact Imager", now U.S. Pat. No. 9,794,454; U.S. Patent Application Publication No. 2016/0028976 of Ran et al., published Jan. 28, 2016 and titled "Digital Imaging with Masked Pixels", now U.S. Pat. No. 9,774,804; and U.S. Patent Application Publication No. 2017/0016829 of Swihart et al., published Jan. 19, 2017 and titled "Contact Imaging Devices for Fluorescence Applications", now U.S. Pat. No. 9,933,565, the entire disclosures of which are hereby incorporated by reference herein for all purposes.

Contact area image sensor 301 may be, for example, a charge coupled device (CCD) sensor, a complementary metal oxide semiconductor (CMOS) sensor, an organic photodiode sensor, or another suitable kind of sensor. In general, such sensors exploit the property of some semiconductor materials that when the material is struck by light, free electrons are generated in proportion to the intensity of the light. The sensor is divided into specific light-sensitive areas called "pixels". To capture an image, the pixels are reset and then exposed to light for an exposure time. At the end of the exposure time, the amount of charge accumulated in each pixel is measured and converted to a numerical value. An array of these numerical values may be called a "digital image", with each value in the array representing the brightness of the light falling on the corresponding pixel. In the digital image, the values may also be referred to as pixels.

In a CCD sensor, the accumulated charges are shifted off of the sensor to a charge amplifier, the output of which is digitized for each pixel. In a CMOS sensor, the accumulated charge can be read from each pixel directly, without shifting. In some sensors, different pixels are sensitive to different light wavelength bands, enabling color imaging.

In this context, a "contact" sensor is one that receives light directly from locations on the target in contact with a face of the sensor, with 1:1 magnification and without any intervening magnification-changing optics. (There may be other kinds of optical components between the contact surface and the light-sensitive semiconductor layer, for example a fiber faceplate as described in U.S. Patent Application Publication No. 2017/0016829, previously incorporated by reference.) This kind of sensing is analogous to the making of a "contact print" in film photography, in which a photographic negative is placed in direct contact with photo paper and exposed to light. An image is formed on the paper that is the same size as the negative.

Referring again to FIG. 3, contact area image sensor 301 is preferably slightly larger in area than a typical blot, for example about 7×10 centimeters. In other embodiments, contact area image sensor 301 may be about 5×7 inches, 8×10 inches, or 9×12 inches, or another suitable size. Contact area image sensor 301 preferably includes many thousands or even millions of pixels, which are small enough that a digital image captured by contact area image sensor 301 provides a high resolution representation of a target placed on the sensor. For example, each pixel may be about 130 microns square, or another suitable size. A sensor 7×10 centimeters with 130-micron pixels would have about 414,000 total pixels.

Figure 4:
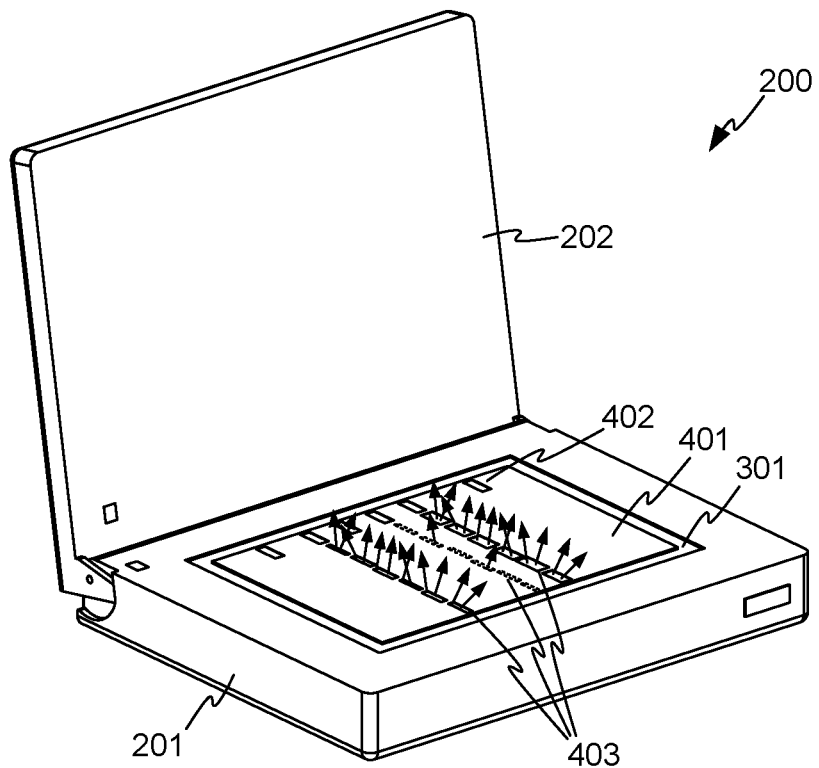
FIG. 4 illustrates a target in the form of a blot similar to the blot of FIG. 1, placed on a contact area image sensor of a device such as the imaging device of FIG. 2.

In FIG. 4, lid 202 has been opened, and a target 401 in the form of a blot similar to blot 100 is placed on contact area image sensor 301. Target 401 includes a lane 402 of protein standards that do not emit light, as well as a number of locations 403 that do emit light by chemiluminescence, indicating the presence of particular proteins that have been separated in the experiment. While only the top surface of target 401 is visible in FIG. 4, the chemiluminescent light is emitted from both sides, and some of the light is directed downward toward contact area image sensor 301.

Once target 401 is in place, lid 202 is closed. Lid 202 shields contact area image sensor 301 from ambient light when lid 202 is in the closed position. With lid 202 in the closed position, digital images can be captured if target 401 using contact area image sensor 301. To capture a digital image, image sensor 301 is flushed of accumulated charge, and then read after a predetermined time called the exposure time. In addition, the act of reading contact area image sensor 301 takes a finite amount of time, as charges must be shifted off of the sensor (in a CCD sensor) or the pixels must be read sequentially (in a CMOS sensor).

In general, portions of target 401 where the chemiluminescence is strongest will appear brighter in the digital image, and portions of target 401 where chemiluminescence is weaker or non-existent will appear darker. The relative strength of the chemiluminescence may permit an approximate quantification of the amounts of different proteins present in the sample.

Figure 5:
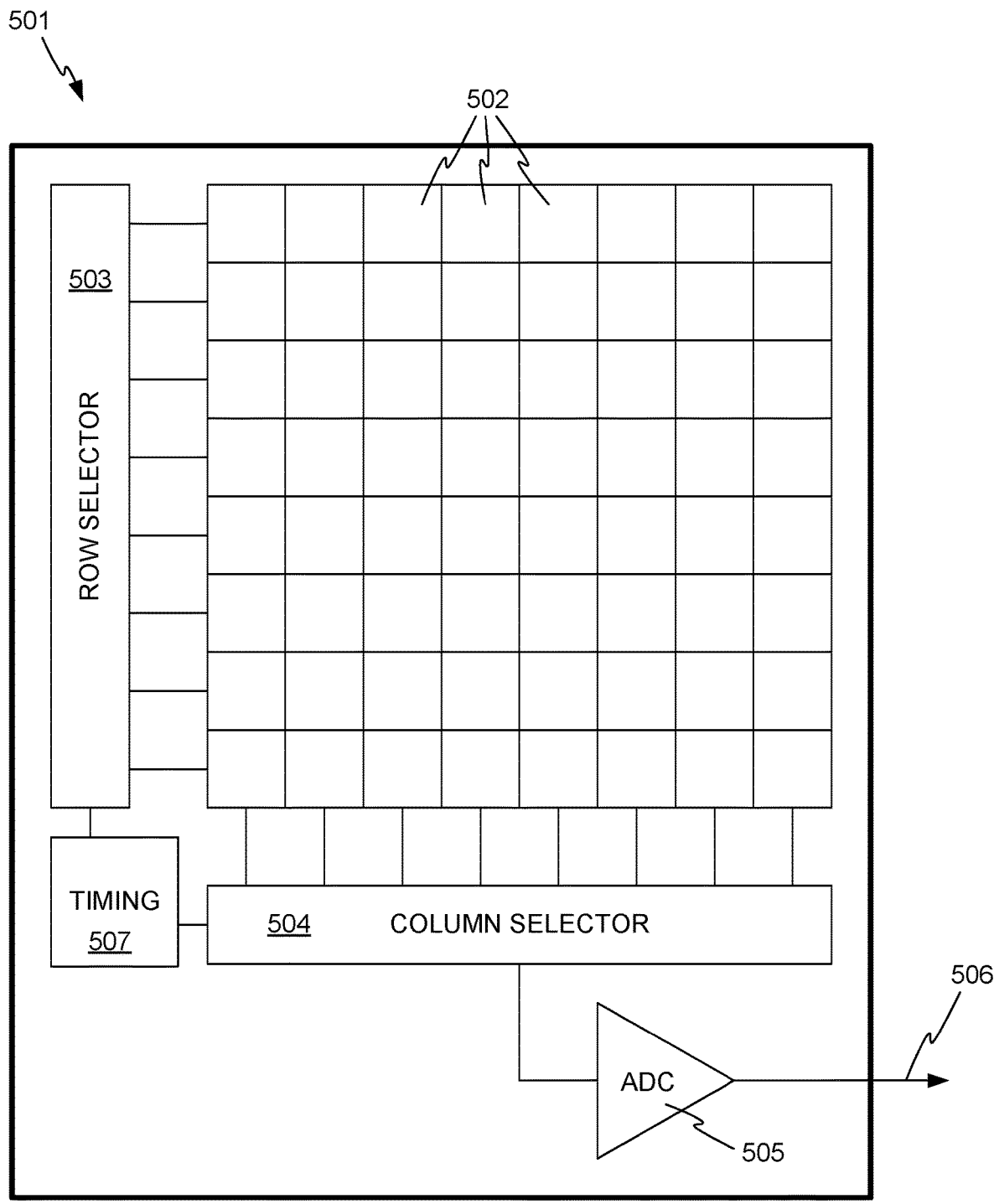
FIG. 5 illustrates a simplified block diagram of a CMOS image sensor, in accordance with embodiments of the invention.

FIG. 5 illustrates a simplified block diagram of a CMOS image sensor 501 having 64 pixels 502. In practice, CMOS sensors may have up to hundreds of thousands or millions of pixels. Each pixel 502 includes a light-sensitive area, and a number of transistors (not shown). The transistors enable selection of individual pixels by row selector 503 and column selector 504, and conversion of the charge in the respective pixel to a voltage. The voltage of the selected pixel is presented to analog-to-digital converter (ADC) 505 for conversion to a digital value, which is output from the sensor at 506. Under control of timing logic 507, pixels 502 can be reset (cleared of charge), exposed for a predetermined time, and read out through ADC 505. The resulting numerical values can be collected by an external computer and assembled into a digital image. A CMOS sensor has the advantage that pixels may be read out individually and selectively from any portion of the sensor; it is not necessary to read all of the pixels. In addition, ADC 505 may be formed in the same integrated circuit as pixels 502 in a CMOS sensor.

Figure 6:
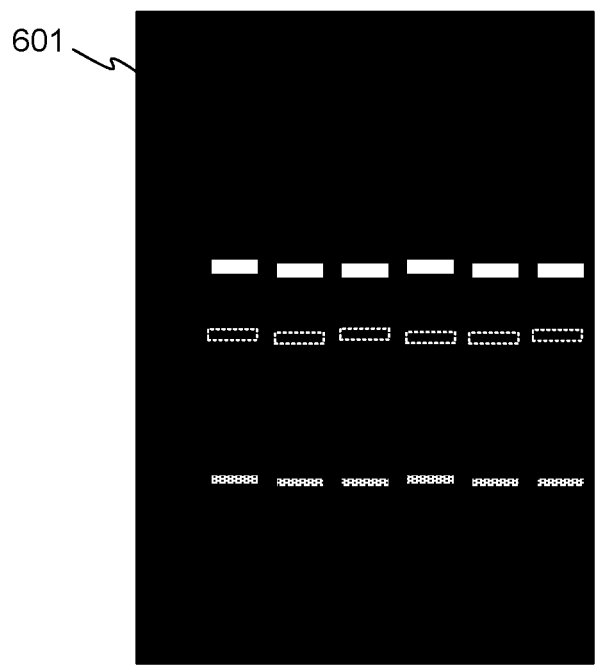
FIG. 6 illustrates a digital image as may be captured from the target of FIG. 4.

FIG. 6 illustrates a digital image 601 as may be captured from target 401. The generation of digital image 601 from the output of contact area image sensor 301 may be accomplished in any suitable way. For example, imaging device 200 may contain a controller that performs all of the necessary conversions and calculations, and stores digital image 601 in a standard image file format such as JPEG (Joint Photographic Experts Group), TIFF (Tagged Image File Format), GIF (Graphics Interchange Format), PNG (Portable Network Graphics), or any other suitable standardized or proprietary format. In other embodiments, signals may be passed from imaging device 200 to a suitable computer system, which converts the signals and generates the digital image file. Any workable architecture and division of tasks may be used.

An electronic array light sensor such as contact area image sensor 301 has inherent limitations. For example, each pixel of an electronic array light sensor has a finite capacity to accumulate charge. So long as the amount of charge stays below the pixel's charge capacity, the amount of charge is linearly proportional to the intensity of light that fell on the pixel during the exposure time. However, when sufficient charge has accumulated to fill the pixel to capacity, any additional generated electrons are spilled into the substrate of the sensor, and no further charge is accumulated in the pixel. This condition is known as saturation. When a pixel has saturated, it is impossible to know the amount of light that fell on the pixel, except to note that the light was sufficient to saturate the pixel. And when two pixels are saturated, it is impossible to know if one of them may have received more light than the other, because the digital values read for the two pixels will be the same. Stated another way, once saturation occurs, the pixel's response is no longer linear.

Another inherent limitation of electronic array light sensors is noise. For example, even when a pixel is not exposed to light, it will accumulate a small amount of charge, and may return a non-zero digital value when read. This is known as dark noise. The amount of dark noise varies from pixel to pixel, and is affected by the temperature of the pixel, among other factors. Dark noise may have a relatively fixed component for each pixel (called fixed pattern dark noise), and a random component. Dark noise can make it difficult to read very low light intensities, because the signal generated from exposure to the light may be swamped by the dark noise. Many techniques have been developed for reducing or compensating for dark noise, including cooling the sensor, characterizing the dark noise to the extent possible and subtracting the characterized noise from subsequent images, and other techniques.

Another kind of noise inherent in electronic array light sensors is called shot noise. Shot noise results from random variation in the number of photons collected by a sensor pixel. Shot noise has a root-mean-square value proportional to the square root of the image intensity, and thus shot noise is much more significant in proportion to the desired signal in low light conditions than in bright light conditions. (The ratio of a number to its square root is larger for large numbers than for small numbers.) Thus, shot noise can also contribute to the difficulty of reading low light intensities. Due to its random nature, shot noise cannot be calibrated away. Techniques for dealing with shot noise may include taking images with long exposure times, or averaging multiple exposures.

Other noise sources exist in digital imaging as well, for example read noise. In general, the more light that is available for imaging, the less noise will affect the final image. While fixed pattern noise can be largely compensated by proper calibration, random noise sources cannot.

These limitations—especially pixel charge capacity and dark noise—determine the dynamic range of a particular sensor. The dynamic range indicates the range of image brightness that can be captured in a single exposure, without saturation in the bright areas and with enough signal in the dark areas to distinguish the signal from noise.

Unfortunately, electrophoresis blots often produce very weak light signals in some areas and very bright signals in other areas, so that the brightness range of the blot far exceeds the dynamic range of a typical electronic array light sensor, even when steps are taken to calibrate for noise as much as possible.

One technique that is sometimes used to deal with large ranges of brightness is called high dynamic range (HDR) imaging. In HDR imaging, two or more exposures are taken of the same scene (such as a blot), with different exposure times. For example, one exposure may be very short, so that even the brightest areas of the blot do not saturate their corresponding sensor pixels. A second exposure may be taken with a much longer exposure time. Chemiluminescent signals from the darkest part of the blot may not be detectable in the first short exposure, because the signals are small in relation to the various noise sources. The signals from the darker areas may be visible and distinguishable from noise in the second, long exposure, but the brightest locations may be saturated. The two exposures are combined mathematically to create an HDR image. For example, the numerical values representing the brightest regions in the first, short exposure image may be multiplied by the ratio of the exposure times, to estimate the numerical values that might have been read for the bright pixels with the longer exposure time, had the pixels not saturated. In this way, the relative brightnesses of the bright and dim signals can be determined, even though it is not possible to accurately capture both in a single exposure. In some applications, more than two exposures may be taken, with graduated exposure times. In some cases, at least some of the multiple exposures may be captured using non-destructive reads performed during a single longer exposure. Such techniques are described in U.S. Patent Application Publication No. 2015/0172526, previously incorporated by reference.

However, even HDR imaging as described above may not completely eliminate saturation in some circumstances. For example, using a contact area image sensor such as contact area image sensor 301, the minimum exposure time is determined by the finite amount of time it takes to read the image out of the sensor. Even if the sensor is reset and reading is initiated immediately, some pixels may saturate by the time they are read. This problem may be exacerbated by higher resolution sensors, which may take longer to read out than sensors having fewer pixels.

Embodiments of the invention use selective reading of portions of a sensor to achieve shorter effective exposure times than are possible when reading the entire sensor, to avoid saturation.

Figure 7:
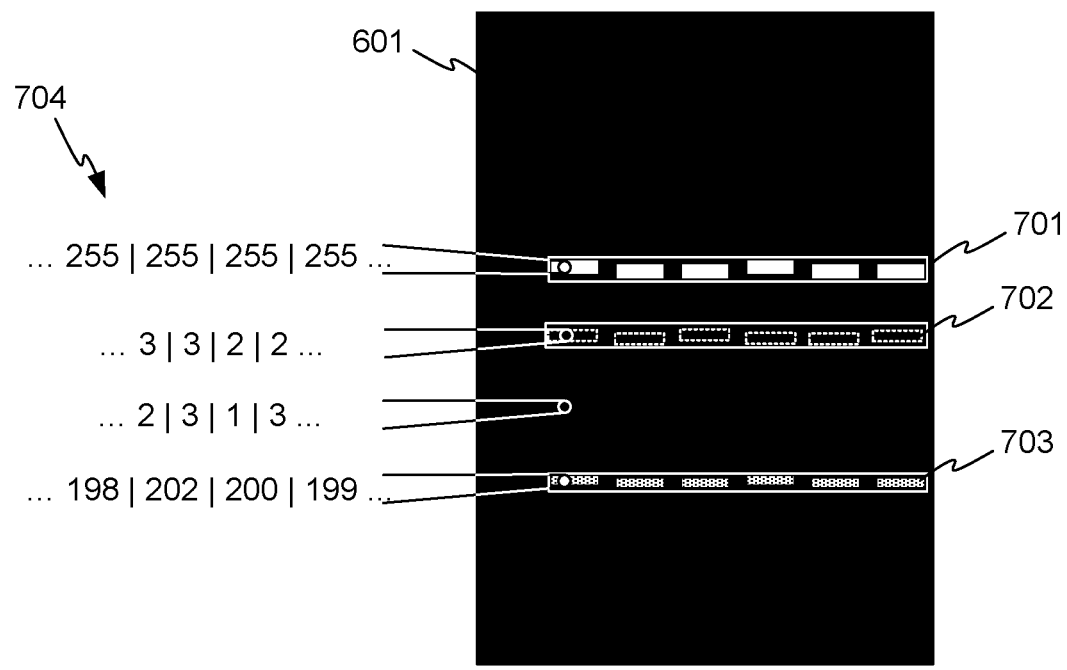
FIG. 7 shows the digital image of FIG. 6, with additional annotation.

Digital image 601 is reproduced in FIG. 7 with additional annotation. It is presumed that the signal pixels in region 701, corresponding to protein band 111, have saturated, the signals pixels in region 703, corresponding to protein band 112 are relatively bright but not saturated, and the signal pixels in region 702, corresponding to protein band 113 are so dim as to be largely indistinguishable from noise present in this single-exposure image. Individual numerical values for certain pixels are shown at 704. For example, if ADC 505 is an 8-bit converter and the system is designed so that saturation of a pixel corresponds to a full-scale reading of ADC 505, all of the numerical values in region 701 may be 255. The numerical values in region 703 may be somewhat less than 255, for example an average of about 200, and the numerical values in region 702 may be very small, for example only slightly larger on average than the values in the surrounding dark areas of the image that contain only readings of noise or background signal from the membrane. This example, having an 8-bit ADC and a range of numerical values of 0-255 is but one example. In other embodiments, different numbers of bits may be used, for example, 10 bits, 12 bits, 16 bits, or another suitable number. In some embodiments, some digital images may be stored using floating point numbers.

Because the values in region 701 are saturated and the values in region 702 are not readily distinguishable from noise, it is not possible to accurately quantify the relative brightnesses of the chemiluminescence in the corresponding regions of target 401.

Conventional HDR imaging may not solve the problem, because the chemiluminescence corresponding to region 701 may be so bright that even reading out the sensor as fast as possible may still result in saturated pixels.

In accordance with embodiments of the invention, a digital image is captured using an entire electronic array light sensor, preferably as fast as possible so that the image has the shortest exposure time possible, and the digital image is investigated to see if it contains any saturated pixels. If not, the image may satisfactorily serve as a short-exposure-time image in a sequence of images used in HDR imaging. However, if the image contains saturated pixels, regions containing the saturated pixels area identified and additional steps are performed to image the identified regions without saturation.

Figure 8:
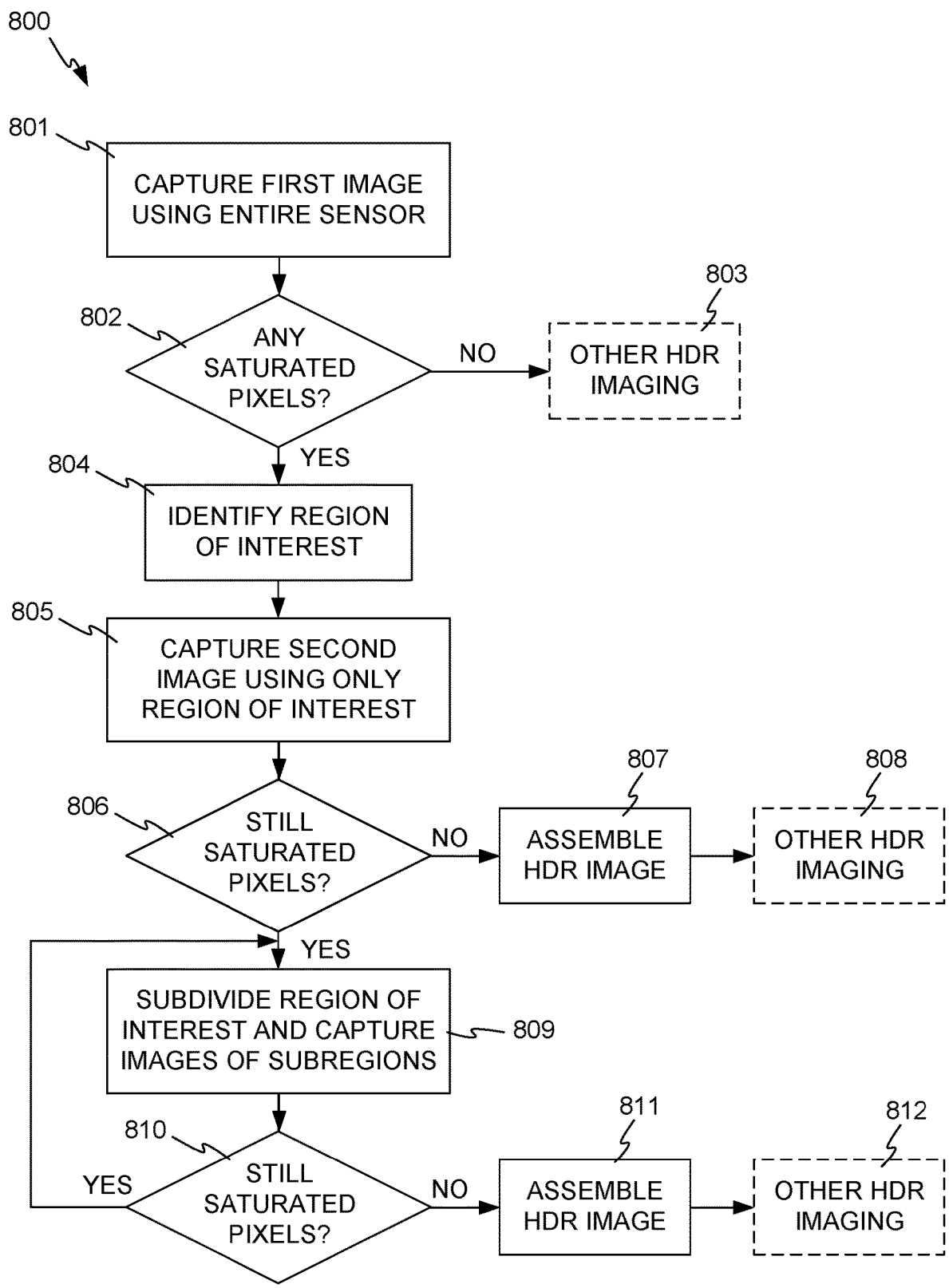
FIG. 8 illustrates a flowchart of a method in accordance with embodiments of the invention.

FIG. 8 illustrates a flowchart of a method 800 in accordance with embodiments of the invention. In step 801, a first digital image is captured. For example, the first digital image may encompass the entire electronic array light sensor, and may be taken as quickly as possible. That is, the sensor is cleared of charge and reading out is initiated immediately.

In step 802, the first digital image is investigated to see if it includes any saturated pixels. For example (for an 8-bit system), the digital values in the digital image may be checked one-by-one, to see if any are 255. If no saturated pixels are identified (or in some embodiments only a negligible number of saturated pixels are identified), conventional or other HDR imaging may be used. The first digital image may serve as the shortest-exposure-time image in the series of digital images used in the HDR imaging process. In extreme cases, images may be taken with exposure times ranging from less than 1 millisecond to several minutes or more.

While embodiments of the invention are described as capturing digital images in increasing order of exposure time, this is not a requirement. In other embodiments, images may be captured in any order.

However, if saturated pixels are identified (or in some embodiments a significant number of saturated pixels are found), a region of interest is identified that encompasses at least some of the saturated pixels. For example, in FIG. 7, region 701 encompasses all of the saturated pixels in digital image 601. Region 701 is smaller than the entire digital image. In this example, region 701 encompasses only about three percent of the total area of digital image 601.

In step 804, a second digital image is captured, encompassing only the region of interest. For example, the sensor is cleared of charge, and the pixels in the region of interest are read out and converted to numerical values. Because region 701 is much smaller than image 601, the second digital image can be read out much more quickly, and has a much shorter exposure time. The pixels in region 701 therefore may not be saturated in the second digital image.

Figure 9:
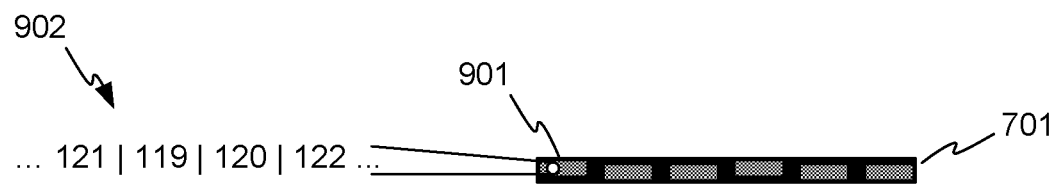
FIG. 9 illustrates a digital image of a region of the digital image of FIG. 7, as captured more quickly than the digital image of FIG. 6.

FIG. 9 illustrates a digital image 901 of region 701, as captured more quickly than digital image 601. Individual numerical values for certain pixels in digital image 901 are shown at 902. For example the pixels that were saturated in digital image 601 now have readings of about 120. The shorter exposure time for digital image 901 has eliminated the saturation of these pixels.

Referring again to FIG. 8, at step 806, the second digital image 901 is examined to see if it contains saturated pixels (which it does not in the example so far). If not, then all of the area of the sample has been characterized in the linear range of the system, and the captured images can be assembled into an HDR image at step 807. In some embodiments, digital images 601 and 901 may be sufficient to assemble an HDR image.

For example, presuming that the exposure time of digital image 601 is 50 milliseconds (a reasonable value for the time required to read out a sensor) and the exposure time of digital image 901 is 5 milliseconds), protein bands 111 corresponding to region 701 result in about 24 numerical counts per millisecond of exposure (120 counts/5 milliseconds), while the somewhat dimmer protein bands 112 corresponding to region 703 result in about 4 numerical counts per millisecond of exposure (200 counts/50 milliseconds). Thus, protein bands 111 are about 6 times as bright as protein bands 112.

Put another way, the pixels sensing bright protein bands 111 would have resulted in numerical values of about 1200 in digital image 601 (24 counts/millisecond×50 milliseconds), if the system had not saturated. This relationship would have been impossible to determine using digital image 601 alone.

Figure 10:
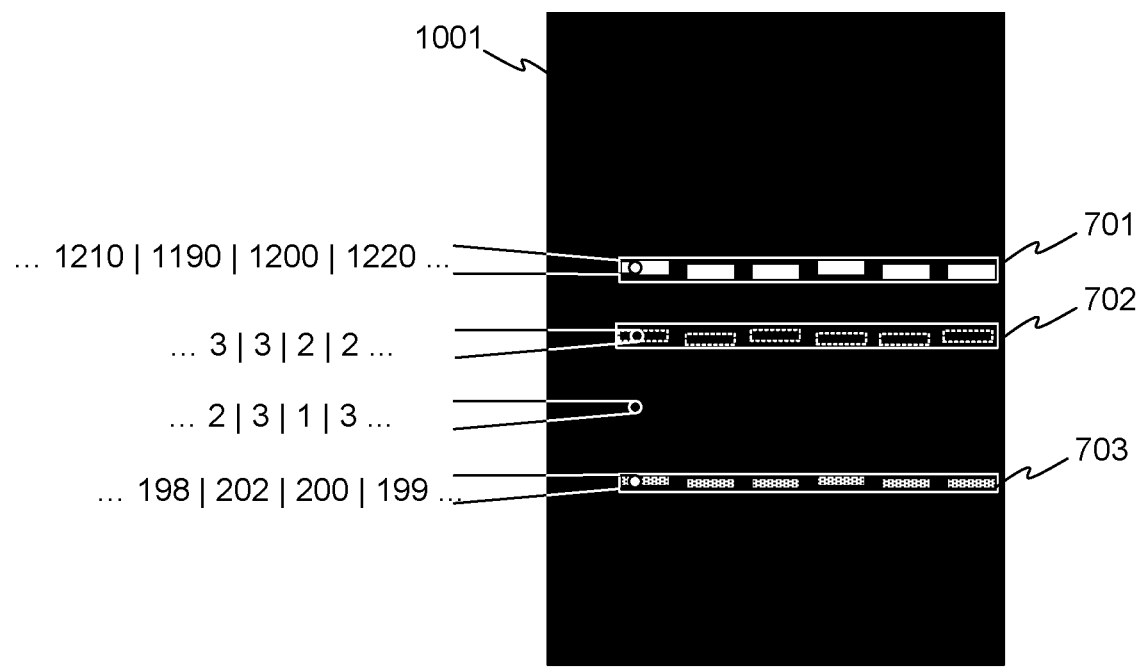
FIG. 10 depicts a high dynamic range digital image assembled from the digital images of FIGS. 6 and 9.

FIG. 10 depicts an HDR digital image 1001 assembled from first and second digital images 601 and 901, and normalized to an exposure time of 50 milliseconds. The values for regions 702 and 703 are taken from digital image 601, and the values in region 701 are computed by multiplying the values from digital image 901 by the ratio of the exposure times of the two images. Because an HDR image is a mathematical construct rather than a single measurement, each of the numerical values may use as many bits are needed, and "saturation" does not occur in the HDR image. In some embodiments, the HDR image may be stored using floating point values, to accommodate the large range of values.

In some embodiments, for example if the protein in protein bands 113 is not of interest, then HDR image 1001 may be the final result. However, in some embodiments, further HDR imaging may be performed (step 808 of FIG. 8) to determine other information about blot 100.

For example, a third digital image of blot 100 may be taken with a long exposure time, in an attempt to discern the relative brightness of protein bands 113 as compared with the other protein bands.

Figure 11:
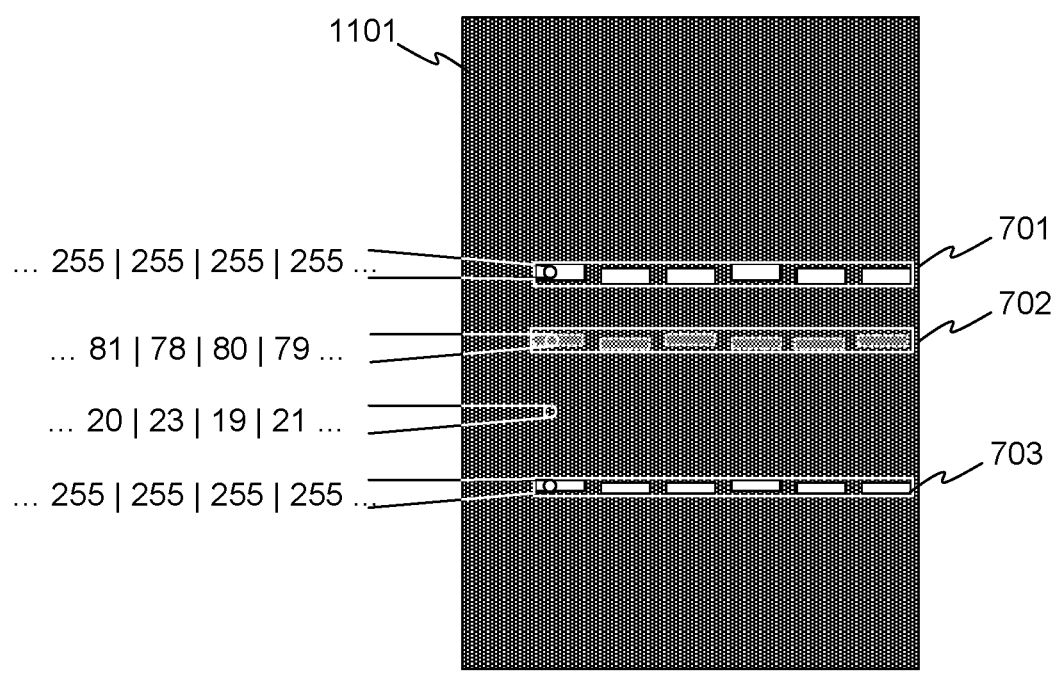
FIG. 11 illustrates another digital image in accordance with embodiments of the invention.

For example, FIG. 11 illustrates another digital image 1101, which in this example is assumed to have an exposure time of 10 seconds, or 200 times the exposure time of digital image 601 (and 2000 times the exposure time of digital image 901). In this image, the pixels corresponding to protein bands 111 (corresponding to region 701) and protein bands 112 (corresponding to region 703) have all saturated. In addition, the pixels corresponding to protein bands 113 (corresponding to region 702) have accumulated significant charge, and the overall background of the image has lightened slightly due to the accumulation of charge from various noise sources. However, because protein bands 113 have actual chemiluminescence signal, the pixels corresponding to them have lightened proportionally more than the background and are visible due to the effect of random noise being less significant for larger signals. In this hypothetical example, the numerical values corresponding to protein bands 113 are on average about 59 counts above the background noise. Because the exposure time of digital image was 10 seconds, or 10,000 milliseconds, protein bands 113 corresponding to region 702 result in about 0.0059 numerical counts per millisecond of exposure (59 counts/10,000 milliseconds).

HDR imaging has thus enabled the determination that the chemiluminescence of protein bands 111 is about 4,067 times as bright as the chemiluminescence from protein bands 113 (24 counts/millisecond/0.0059 counts/millisecond). This range of values would have been impossible to characterize using only digital images whose exposure times resulted in saturation of some pixels. By reading only a region of interest from the sensor for certain bright pixels, the effective dynamic range of the system (including HDR imaging) has been further extended.

In some cases, even the technique described above may not be sufficient to eliminate saturation of all pixels. For example, for very bright chemiluminescence signals, even digital image 901 may be too large to read out before some of the pixels saturate. That is, referring to FIG. 8, the test in step 806 may determine that some pixels are still saturated.

Figure 12:
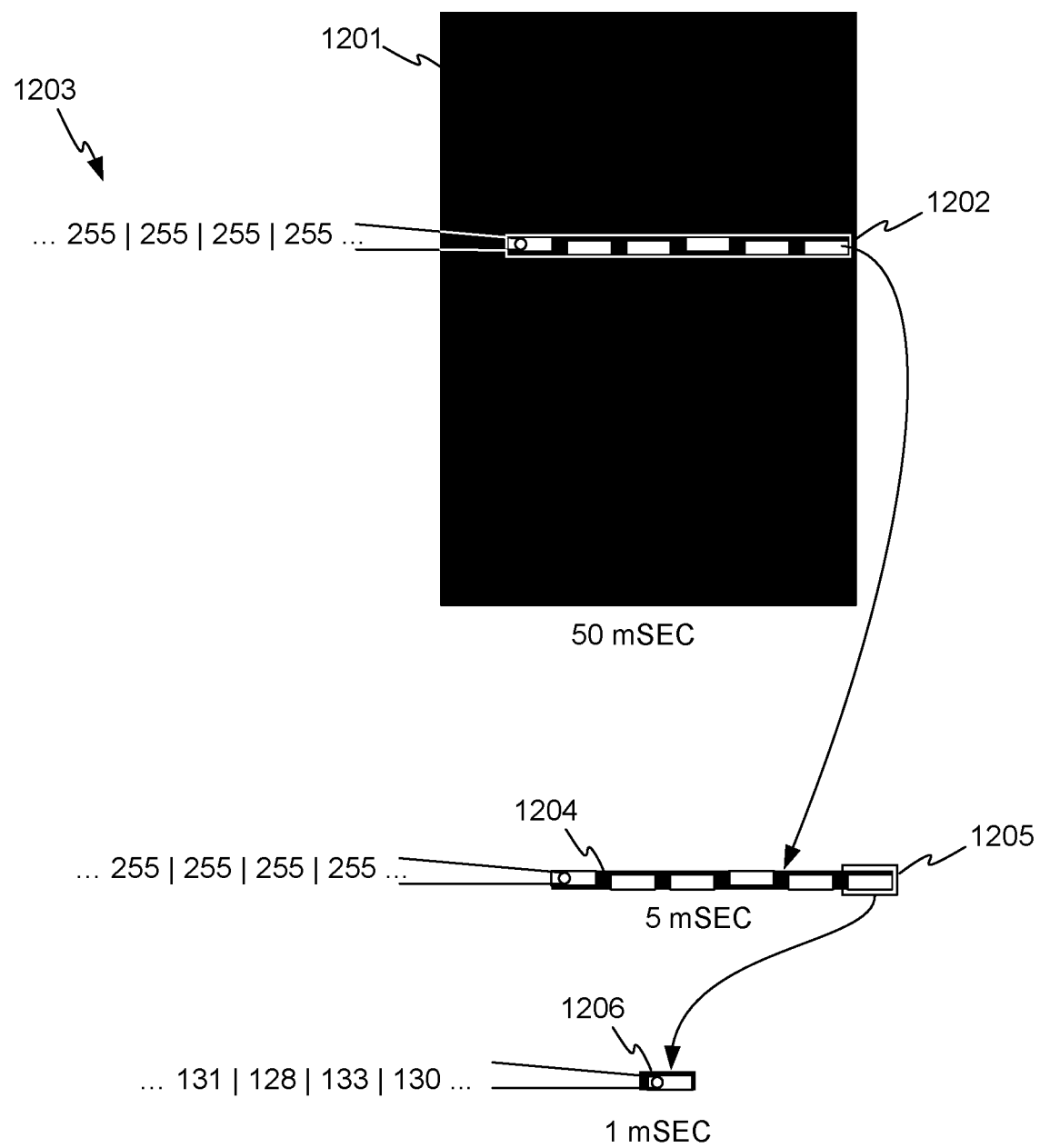
FIG. 12 illustrates another digital image in accordance with embodiments of the invention.

In that case, the region of interest corresponding to digital image 901 may be further subdivided at step 809 shown in FIG. 8. For example, FIG. 12 illustrates a digital image 1201 similar to digital image 601, preferably taken with an exposure time as short as possible for reading the entire sensor, for example an exposure time of 50 milliseconds. The pixels in region 1202 have saturated, as shown at 1203. As before, a second digital image 1204 has been captured, encompassing only the part of the target corresponding to region 1202. Digital image 1204 may be captured much faster than digital image 1201, for example with an exposure time of 5 milliseconds, because it uses only a portion of the sensor. However, as shown in FIG. 12, the pixels in digital image 1204 are still saturated. That is, the chemiluminescence in the corresponding portions of the target is so bright that even the short exposure time of digital image 1204 cannon prevent saturation.

In this case, region 1202 may be further subdivided. For example, rather than using a region of interest encompassing all of the saturated pixels in digital image 1201, discrete contiguous patches of saturated pixels may be isolated, for example in region 1205. The sensor is then reset, and a third digital image 1206 is taken with an even shorter exposure time, for example 1 millisecond. In the example of FIG. 12, this third digital image has successfully read the pixels in region 1205 without saturation, resulting in an average numerical value of about 130. The brightness of the chemiluminescence corresponding to region 1205 may be characterized as about 130 counts per millisecond.

Referring again to FIG. 8, the test at step 810 will indicate that saturation has been avoided, and the first digital image 1201, second digital image 1204, and third digital image 1206 may be assembled into an HDR image in step 811, as described above. Digital images may be similarly captured of the other patches of saturated pixels in region 1205 and assembled into the HDR image. Further HDR imaging may be performed as desired, as shown at step 812.

The subdivision of regions of interest may be done in any suitable manner. In the above example, each discrete patch of saturated pixels defined a separate region of interest, but this is not a requirement. Region 1202 could have been divided into two subregions including three patches each of saturated pixels, and readable in about half the time as region 1202. Or Region 1202 could have been divided into three subregions including two patches each of saturated pixels, and readable in about one third the time as region 1202. Subregions may be selected without regard to the boundaries of any patches of saturated pixels. Subregions need not be all of the same size, and may be any arbitrary portion of the region being subdivided.

And while two subdivisions of digital image 1201 were illustrated above, this is also not a limitation. As is shown in FIG. 8, if the test at step 810 finds saturated pixels, the subdivision may be repeated as many times and to as fine a granularity as needed to avoid saturation, down to and including subregions containing only one pixel if necessary.

Figure 13:
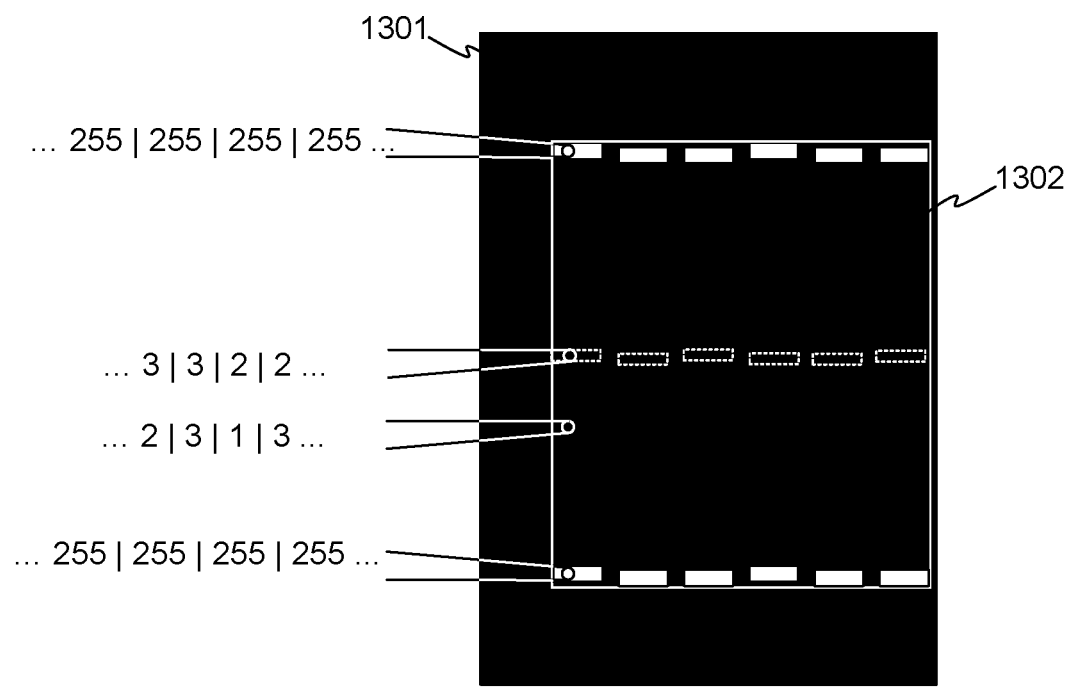
FIG. 13 illustrates another digital image in accordance with embodiments of the invention.

In some embodiments, limits may be placed on the size of subregions. For example, FIG. 13 illustrates a hypothetical blot image 1301, in which widely dispersed parts of the image contain saturated pixels. In this case, a region of interest 1302 encompassing all of the saturated pixels in the image would be nearly as large as digital image 1301 itself, and therefore would require nearly as much time to read. For this reason, the size of the regions of interest may be limited to a relatively small fraction of the region being divided, for example, no more than 30%, 40%, 50%, or another fraction of the region being divided. For example, if the saturated pixels in the first image encompass more than the limiting percentage of the first image, then the first image may be arbitrarily divided into regions of image below the size limit, for example into four or more equal-sized regions of interest, or in another way.

In the example of FIG. 12, regions of interest small enough to avoid saturation were identified iteratively. First, region of interest 1202 was defined encompassing all of the saturated pixels in the image, and when it was found that region of interest 1202 was not small enough to avoid saturation, it was further subdivided. In other embodiments, small regions of interests may be identified directly, without such an iterative procedure.

Figure 14:
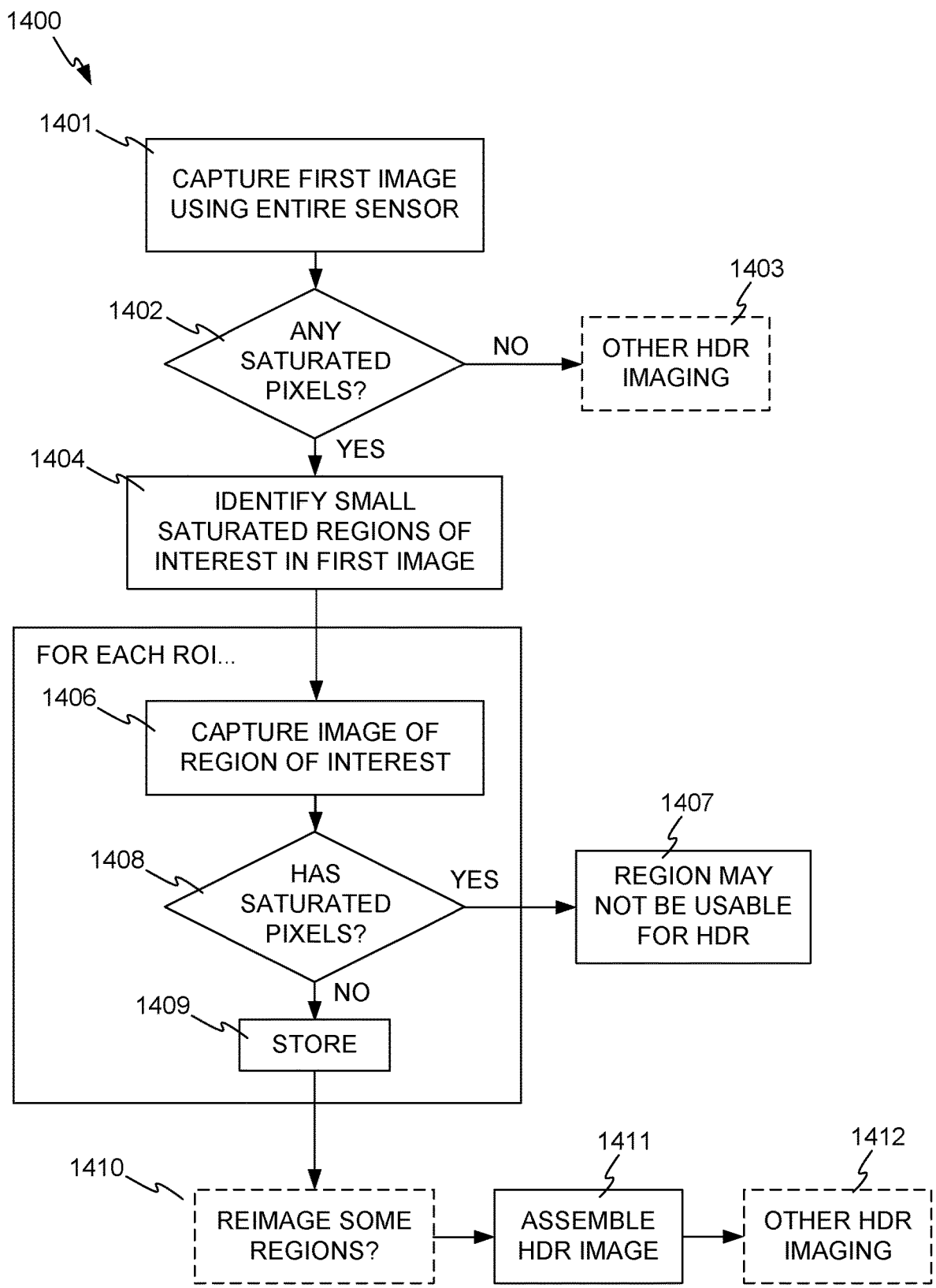
FIG. 14 illustrates a flow chart of a method in accordance with embodiments of the invention.

For example, FIG. 14 illustrates a flow chart of a method 1400 in accordance with such an embodiment. Steps 1401, 1402, and 1403 of method 1400 are similar to steps 801, 802, and 803 of method 800 described above. A first image is captured at step 1401 using the entire sensor and preferably read as quickly as possible. If no saturated pixels are found at step 1402, then other imaging may be performed at step 1403.

However, if the first digital image includes saturated pixels, then the image area is divided into smaller regions of interest at step 1404, according to any suitable method. For example, the image area could be divided into a fixed number of equal sized regions of interest. Or each identifiable patch of saturated pixels could be designated a region of interest. Any technique may be use, but preferably the technique divides the image area into small enough regions of interest that the regions can be imaged much more quickly than the entire sensor.

For each of the identified regions of interest, an image of the region of interest is captured at step 1406. The resulting image is checked at step 1408 to see if it includes saturated pixels. If so, and if it is not possible or desired to further subdivide the region of interest, then that particular region may not be usable for quantitative analysis, as shown at step 1407. In some embodiments, it may be possible to apply interpolation techniques or other estimation techniques to estimate the true brightness of the saturated pixels.

Presuming the image of the current region of interest does not include saturated pixels, the image is stored at step 1409, along with an indication of its exposure time, and control passes back to step 1406.

Once all of the regions of interest are processed, it may be desirable to re-image some of the regions. For example, any region in which the pixels are not close to saturation could be re-imaged with a longer exposure time, to capture a digital image with a better signal-to-noise ratio. Adjacent regions having similar brightnesses may be combined for re-imaging.

In any event, the stored digital images from the regions of interest can be assembled into an HDR image at step 1411. Other imaging may be performed as well, as shown by step 1412.

Figure 15:
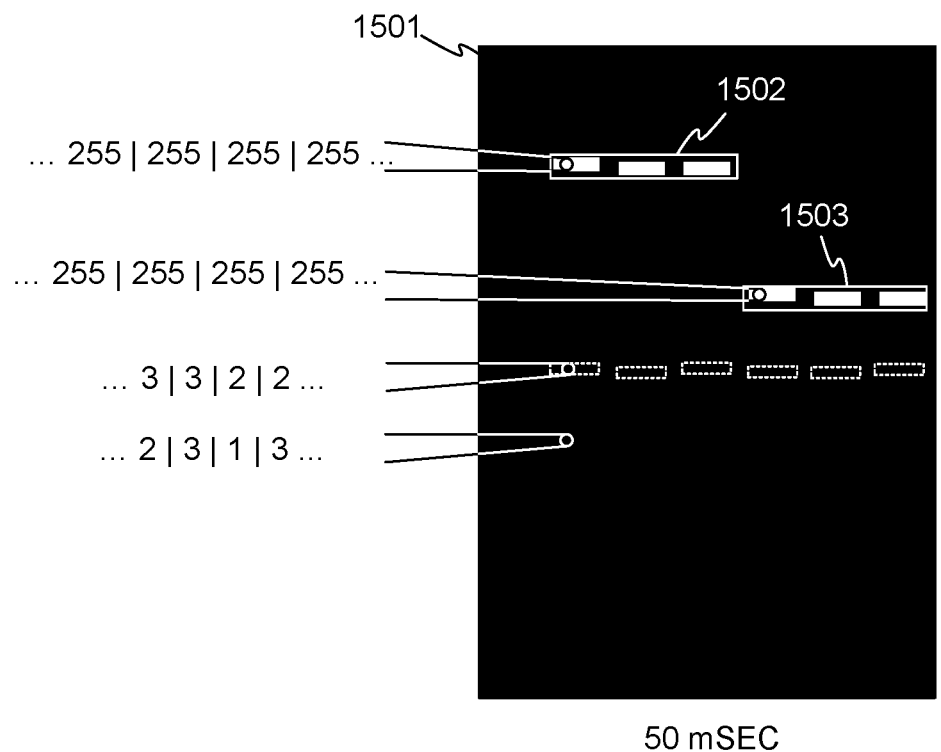
FIG. 15 illustrates another digital image in accordance with embodiments of the invention.
Figure 16:
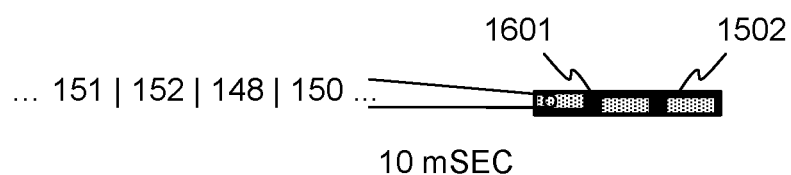
FIG. 16 illustrates another digital image in accordance with embodiments of the invention.

Compiling an HDR image may be performed in any workable way, but in some embodiments may be performed incrementally, as follows. FIG. 15 illustrates a digital image 1501 serving as an example. Using techniques described above, two regions of interest 1502 and 1503 have been identified as containing saturated pixels. For the sake of example, the exposure time for digital image 1501 was 50 milliseconds. Each of regions 1502 and 1503 is small in comparison to the entire digital image 1501, and can be read much more quickly. For example, FIG. 16 illustrates a digital image 1601, which was collected from region of interest 1502 with an exposure time of 10 milliseconds. As is apparent, at a 10 millisecond exposure time, the pixels in region 1502 are no longer saturated, and have an average numerical value of about 150 numerical counts. Digital image 1601 is stored for later use, along with an indication of its 10 millisecond exposure time.

Figure 17:
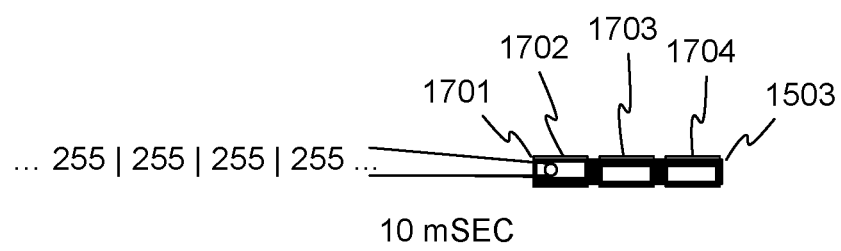
FIG. 17 illustrates another digital image in accordance with embodiments of the invention.

FIG. 17 shows a similar digital image 1700, collected from region of interest 1503 with an exposure time of 10 milliseconds. As is apparent, the pixels are still saturated, so using the techniques described above, region 1503 is further subdivided, shown as regions of interest 1702, 1703, and 1704, so that each of the patches of saturated pixels can be imaged separately with an even shorter exposure time.

Figure 18:
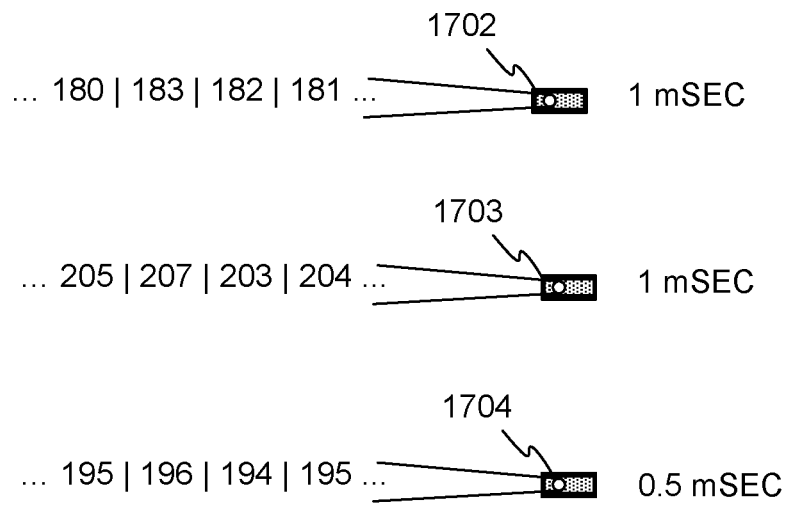
FIG. 18 shows the results of imaging certain regions of the digital image of FIG. 17, with shorter exposure times.

FIG. 18 shows the results of imaging regions 1702, 1703, and 1704, with shorter exposure times. Regions 1702 and 1703 were successfully imaged without saturation at an exposure time of 1 millisecond, but as is shown, region 1704 required an exposure time of 0.5 milliseconds to avoid saturation. These images are usable for HDR imaging and are stored, along with indications of their exposure times.

Figure 19:
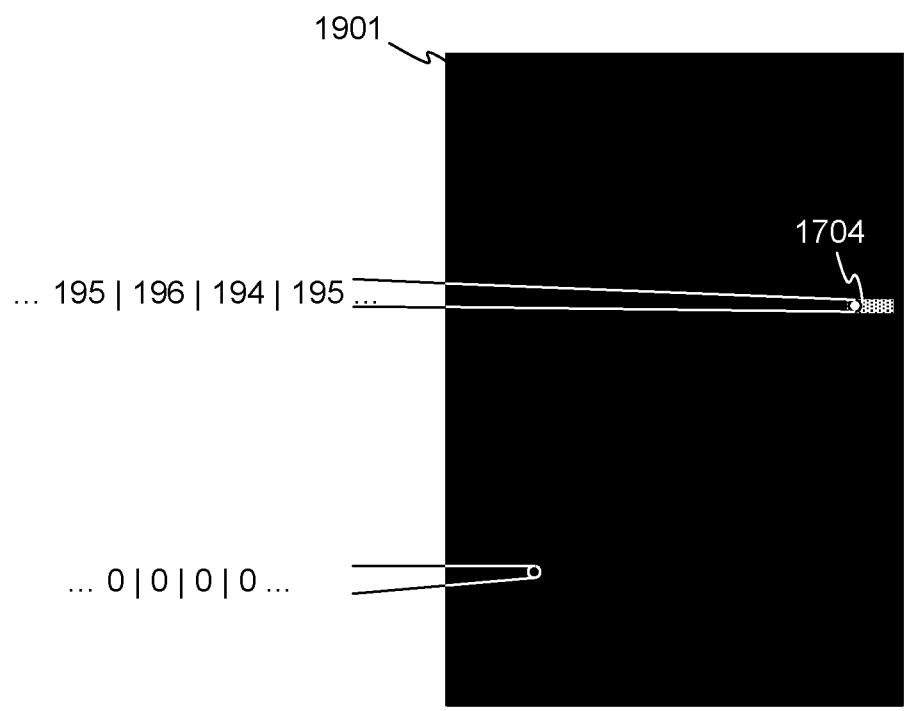
FIG. 19 illustrates an initial step in the construction of a high dynamic range image, in accordance with embodiments of the invention.

To incrementally create an initial HDR image, an initially-blank digital image 1901 may be first created, having all its pixels set to zero intensity, as shown in FIG. 19. The stored images of regions 1502, 1702, 1703, and 1704 are the incrementally placed, starting with the image having the shortest exposure time—in this case the image of region 1704.

Figure 20:
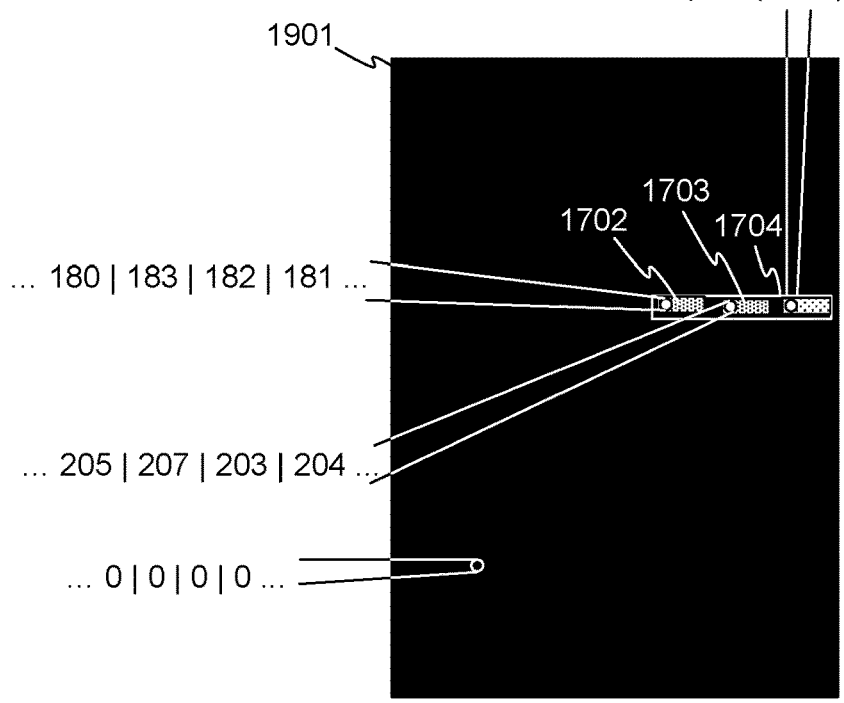
FIG. 20 illustrates another step in the construction of a high dynamic range image, in accordance with embodiments of the invention.

Next, the digital images from regions 1702 and 1703 are added, as shown in FIG. 20. Because their exposure time was twice the exposure time of region 1704, the numerical values of the pixels corresponding to region 1704 in image 1901 are doubled in the process. That is, all of the numerical values are normalized to the higher exposure time, which is 1 millisecond so far.

Figure 21:
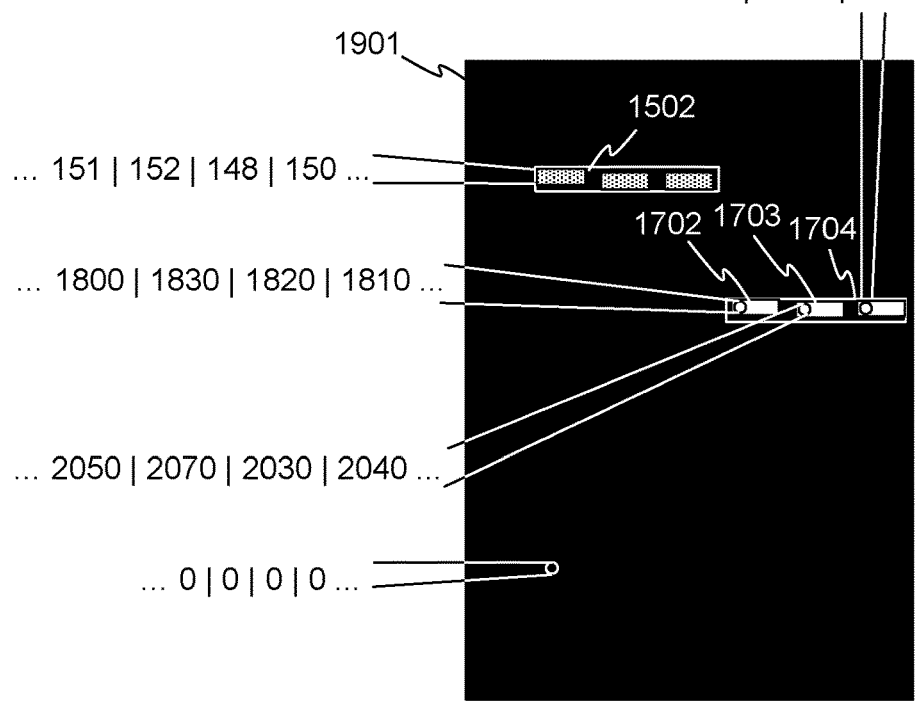
FIG. 21 illustrates another step in the construction of a high dynamic range image, in accordance with embodiments of the invention.

Finally, digital image 1601 corresponding to region 1502 is placed into HDR image 1901, as shown in FIG. 21. Because the exposure time of digital image 1601 was 10 times the exposure time used to capture regions 1702 and 1703, all of the existing numerical values are multiplied by 10, to normalize them to the 10 millisecond exposure time.

Once HDR image 1901 has been constructed, accommodating the pixels that saturated in initial image 1501, HDR image 1901 can serve as the basis for further HDR imaging. As additional images are taken in increasingly long exposure times, the pixels in regions of interest in HDR image 1901 can be further normalized to the increasingly long exposure times, and their relative brightness preserved throughout the process.

In other embodiments, the stored images, for example the non-saturated images of regions 1502, 1702, 1703, and 1704 may be examined to see which has the longest exposure time, and each of the images may be normalized and placed into HDR image 1901 in one step by normalizing its numerical values directly to the longest exposure time.

The examples above presume that the imaging system is designed so that the system electronics have the same usable range as the sensor pixels, and the saturation level of a pixel corresponds to a full-scale reading of the ADC, such as 255 for an 8-bit ADC. However, this is not a requirement, and may only rarely be true. For example, if the electronics of the system have a wider usable range than the pixels themselves, the saturation level of a pixel may be read as less than a full-scale ADC reading, such as 250 for an 8-bit ADC. In that case, identifying saturated pixels in the resulting digital image would mean identifying pixels having a numerical value of 250 or more (in this example), rather than 255.

Similarly, the electronics of the system may have a narrower usable range than the pixels themselves. For example, an amount of charge less than saturation may be converted to a full-scale ADC reading. In this case, the ADC saturates while the sensor pixels still have available charge capacity. For the purposes of this disclosure, the term "saturated pixel" encompasses this situation, as well as the situation where a pixel's charge storage capacity is exceeded. The effect is similar, in that numerical values read by the system cease to be linear with light intensity when the ADC range is exceeded.

In some embodiments, pixels may be identified as "saturated" when they exceed an arbitrary brightness threshold that may be somewhat below the charge capacity of the pixels and below the full-scale ADC reading. For example, in a system with an 8-bit ADC where actual pixel saturation is read as a value of 252, pixels could be identified as saturated when their numerical values exceed 245 or a similar threshold. This technique may better accommodate noise, temperature variations, and the like.

Figure 22:
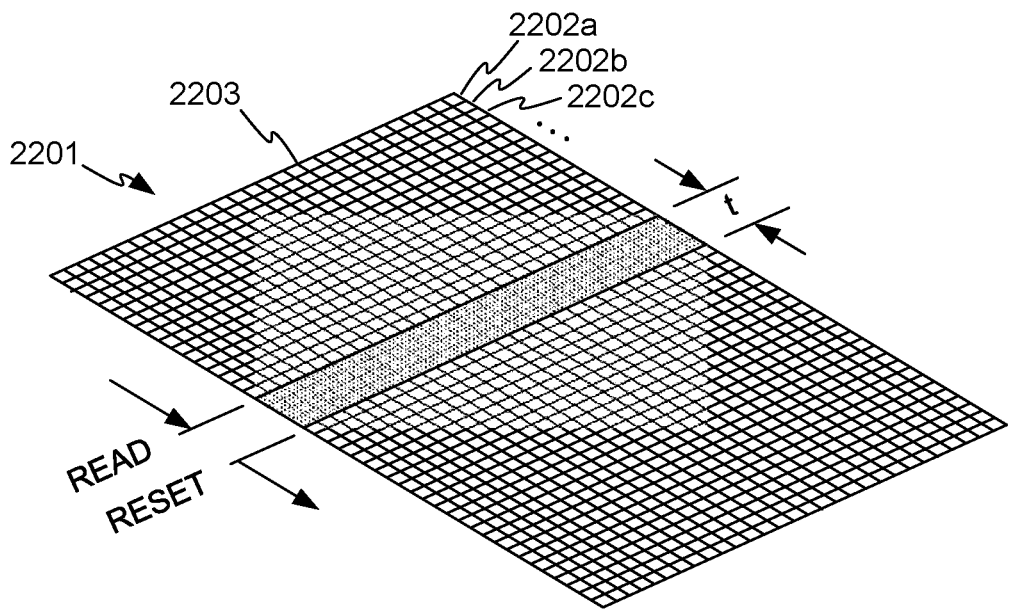
FIG. 22 illustrates a rolling shutter, in accordance with embodiments of the invention.

The embodiments above have been explained in the context of a sensor that can be globally reset, and that continues to accumulate charge until its next reset, much in the manner of leaving the shutter open in a camera to take a very long exposure. In other embodiments, certain reads may be performed using a "rolling shutter" mode, as is illustrated in FIG. 22. In sensor 2201, rows 2202$a$, 2202$b$, 2202$c$, etc. are reset sequentially starting from first edge 2203 of sensor 2201. A short time later (the exposure time t), the rows are read out sequentially, also starting from first edge 2203. Presuming the exposure time t is shorter than the time required to read all of the rows, the resets proceed across the sensor ahead of the reads, separated by a distance that depends on the exposure time, but may be a small as one row. In this way, the exposure time for each individual pixel may be much shorter than the time required to read the entire sensor. The pixels are not all exposed at the same time, but this has no detrimental effect, as the image being taken changes very slowly compared with the reading times involved. Portions of sensor 2201, smaller than the entire sensor, may be read in this way as well.

The above embodiments have been explained primarily in the context of a CMOS image sensor, in which individual pixels, or at least rows of pixels, can be read directly. In a CMOS sensor, it is typically not necessary to read the entire sensor if only small region is of interest.

In other embodiments, a CCD sensor may be used. A CCD is similar to a CMOS sensor in that pixels in the sensor accumulate electric charge in proportion to the intensity of light falling on the pixels. However, CCD sensors differ in the way the charge amounts are read.

Rather than reading charges directly from individually-addressable pixels (as in a CMOS sensor), the charges in a CCD are shifted off of the sensor in "bucket brigade" style and presented to a charge amplifier that converts each charge amount to a voltage that can be digitized.

Figure 23:
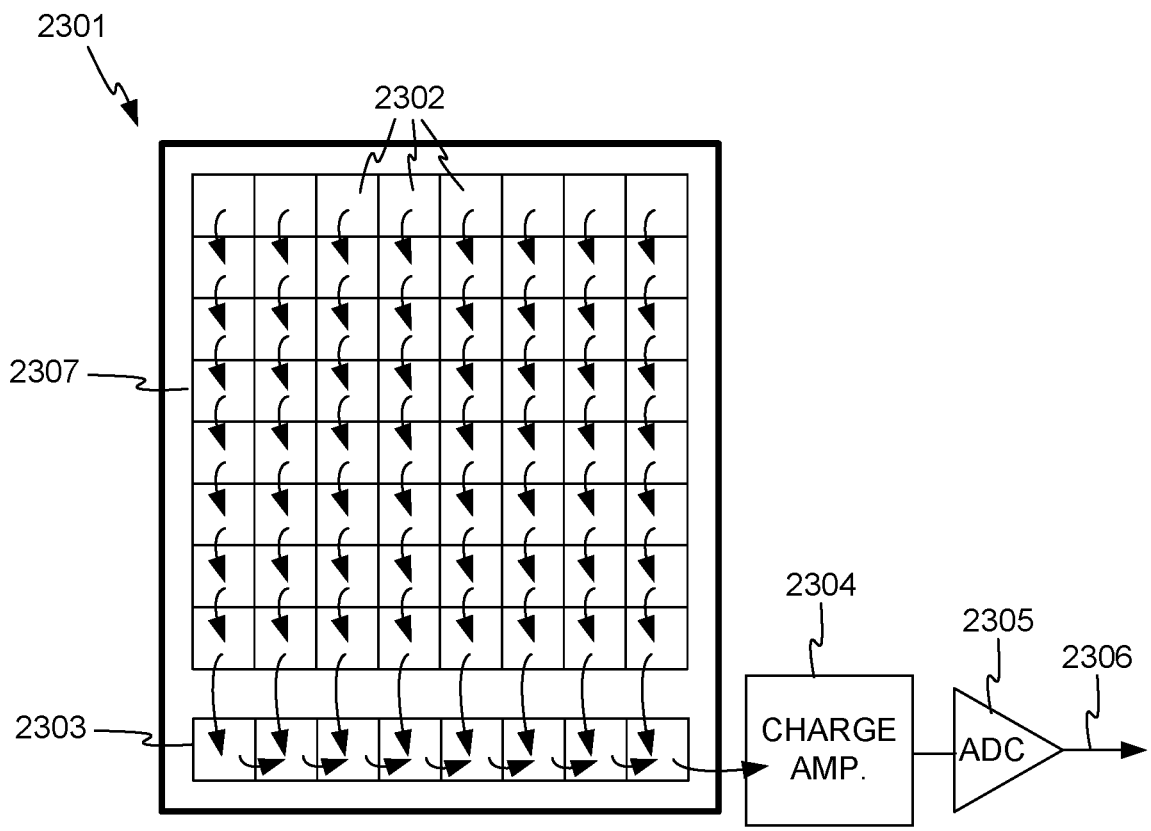
FIG. 23 illustrates a simplified block diagram of a CCD image sensor, in accordance with embodiments of the invention.

FIG. 23 illustrates a simplified schematic diagram of a CCD sensor 2301. CCD sensor 2301 has a number of pixels 2302 arranged in an array of rows and columns. To read CCD sensor 2301, the accumulated charges are shifted row-by-row into a shift register 2303, and then pixel-by-pixel through shift register 2303 to charge amplifier 2304. Charge amplifier 2304 converts each charge to a voltage, which is then converted to a numerical value by an analog-to-digital converter (ADC) 2305 and output digitally at 2306. For a CCD sensor, ADC 2305 is typically an external device, and not integrated into the sensor itself.

In CCD sensor 2301, individual pixels 2302 cannot be addressed and read directly. In order for the charge of any particular pixel to be measured, it must be shifted to charge amplifier 2304. However, it is not necessary that all charges be converted to numeric values. For example, to read the pixels in particular row 2307, the charges in the rows below row 2307 may be shifted into shift register 2303 and simply discarded immediately, for example flushed to the substrate of CCD sensor 2301, rather than being shifted to charge amplifier 2304. Once the charges from row 2307 arrive in shift register 2303, they can be shifted to charge amplifier 2304 and converted. In this way, small areas of sensor 2301 may be read quickly. This technique may be used in embodiments of the invention using CCD sensors, to read small regions of interest as quickly as possible.

If the sites in shift register 2303 have a larger charge capacity than the pixels 2302, then the readout time can be further reduced by binning. For example, if the shift register sites 2303 have at least double the charge capacity of the pixels 2302, then the charges from two rows of pixels 2302 can be shifted into shift register 2303 without risk of saturating the shift register sites. The charges in shift register 2303 can then be shifted out through charge amplifier 2304 and converted to numerical values by ADC 2305. In this way, sensor 2301 or a portion of it can be read nearly twice as fast, at the expense of a reduction in image resolution. If the charge storage sites in shift register 2303 have an even larger charge capacity, for example at least three times the charge capacity of pixels 2302, then more lines can be binned, resulting in even faster readout, and less risk of saturation of any one pixel 2302.

Sensor 2301 is a full frame CCD sensor, with its sensor area essentially completely filled with light-sensitive pixels. Binning may also be used in an interline transfer type CCD. In an interline transfer CCD, part of the imager area is taken up by charge storage sites that are shielded from light. Charges from the pixels can be shifted into the storage sites a read out at leisure. If the storage sites have a larger charge storage capacity than the pixels, then binning may be utilized.

In other embodiments, a sensor having multiple taps may be used. In a multiple-tap sensor, there are two or more readout paths that can operate in parallel, and therefore readout can be accomplished roughly twice as fast or more than with a single-tap sensor. For example, in a CMOS sensor, two ADCs may be provided, with one half of the pixels being routed to one of the ADCs for conversion, and the other half of the pixels being routed to the other ADC for conversion. Any workable number of taps may be provided.

A similar technique can be used with a CCD sensor. For example, two shift registers similar to shift register 2303 may be provided on opposite sides of the pixel array. Each of the shift registers is provided with its own charge amplifier and ADC. Half of the rows may be shifted to each of the two shift registers, enabling reading the sensor twice as fast. Again, any workable number of taps may be used.

Depending on the sensor type and the readout design of the sensor, the smallest readable region may be a single row of pixels, a single column of pixels, or even a single pixel.

Figure 24:
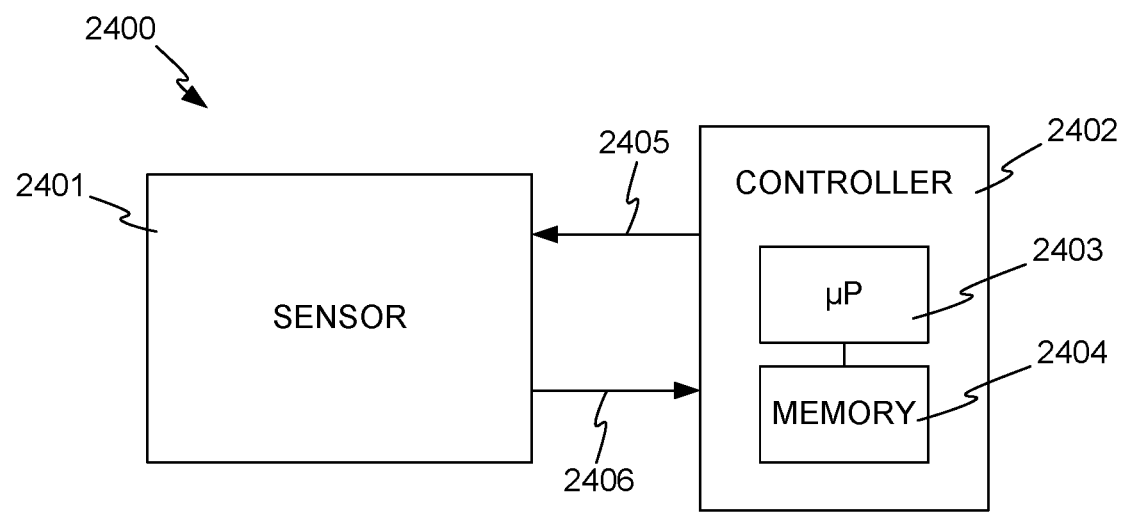
FIG. 24 illustrates an imaging system in accordance with embodiments of the invention.

FIG. 24 illustrates an imaging system 2400 in accordance with embodiments of the invention. Imaging system 2400 comprises an electronic array light sensor 2401 and a computerized controller 2402. Controller 2402 further comprises a processor 2403 and a memory 2404. Memory 2404 holds instructions that, when executed by processor 2403, cause the system to carry out embodiments of the invention. Memory 2404 may hold other kinds of data as well, including image data.

Controller 2402 controls sensor 2401 via one or more control signals 2405, and receives data from sensor 2401 via one or more data signals 2406.

Sensor 2401 may be a CMOS sensor, a CCD sensor, or another suitable kind of sensor having pixels. Other elements of the system, for example a charge amplifier that may be present with a CCD sensor, are omitted from FIG. 24.

Any suitable architecture may be used for imaging system 2400. For example, control signals 2405 may preferably be digital signals. Data signals 2406 may be digital signals, for example in the case where sensor 2401 has its own built-in analog-to-digital converter or converters. In other embodiments, data signals 2406 may be analog signals and conversion to digital values may be performed in controller 2402. Many other variations are possible.

While embodiments of the invention have been described in the context of CMOS and CCD sensors, it will be recognized that the claims encompass the use of other kinds of sensors, including those yet to be developed.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. The invention has now been described in detail for the purposes of clarity and understanding. However, those skilled in the art will appreciate that certain changes and modifications may be practiced within the scope of the appended claims.

What is claimed is:

1. A method of image capture, the method comprising:
capturing a first digital image of an at least partially luminescent target using an electronic array light sensor of a contact imager;
identifying one or more saturated pixels in the first digital image;
identifying a first region of interest in the first digital image, the first region of interest encompassing at least some of the one or more identified saturated pixels; and
capturing a second digital image of the target using the electronic array light sensor of the contact imager, the second digital image encompassing only the first region of interest, and the second digital image being captured with a shorter exposure time than the first digital image;
identifying one or more saturated pixels in the second digital image;
identifying a second region of interest encompassing at least some of the saturated pixels in the second digital image, the second region of interest being smaller than the first region of interest; and capturing a third digital image of the target using the electronic array light sensor, the third digital image encompassing only the second region of interest, and the third digital image being captured with a shorter exposure time than the second digital image.

2. The method of claim 1, wherein the first digital image encompasses the entire electronic array light sensor, and is read as quickly as possible from the electronic array light sensor.

3. The method of claim 1, wherein the first region of interest encompasses all of the saturated pixels in the first digital image.

4. The method of claim 1, wherein the first region of interest encompasses a discrete patch of saturated pixels.

5. The method of claim 4, wherein the first region of interest encompasses only one of at least two discrete patches of saturated pixels.

6. The method of claim 1, further comprising assembling a high dynamic range digital image of the target using at least the first and second digital images.

7. The method of claim 6, further comprising:
capturing a long-exposure digital image of the target using the electronic array light sensor, the long-exposure digital image being captured with an exposure time longer than the exposure time of the first digital image; and
assembling the high dynamic range digital image using at least the first digital image, the second digital image, and the long-exposure digital image.

8. The method of claim 1, further comprising:
assembling a high dynamic range digital image of the target using at least the first digital image, the second digital image, and the third digital image.

9. The method of claim 1, further comprising:
capturing a long-exposure digital image of the target using the electronic array light sensor, the long-exposure digital image being captured with a longer exposure time than the first digital image; and
assembling a high dynamic range digital image of the target using at least the first digital image and the long-exposure digital image, wherein the second region of interest in the high dynamic range digital image includes data derived from the third digital image.

10. The method of claim 1, wherein the electronic array light sensor is a complementary metal oxide semiconductor (CMOS) sensor, and wherein capturing the second digital image of the target comprises reading fewer than all of the pixels in the electronic array light sensor.

11. The method of claim 1, wherein the electronic array light sensor is a complementary metal oxide semiconductor (CMOS) sensor, and wherein capturing at least one of the first digital image and the second digital image comprises the use of a rolling shutter.

12. The method of claim 1, wherein the electronic array light sensor is a charge coupled device (CCD) sensor, and wherein capturing the second digital image of the target comprises shifting some charges from the CCD sensor and discarding them without conversion to numerical values.

13. The method of claim 1, wherein the electronic array light sensor is a charge coupled device (CCD) sensor, and wherein capturing the second digital image of the target comprises binning of charges in the CCD sensor.

14. The method of claim 1, further comprising limiting the size of the first region of interest in relation to the electronic array light sensor.

15. The method of claim 1, wherein the second digital image is captured at a lower resolution than the first digital image.

16. A method of image capture, the method comprising:
capturing a first digital image of an at least partially luminescent target using an electronic array light sensor of a contact imager;
identifying one or more saturated pixels in the first digital image;
identifying a first region of interest in the first digital image, the first region of interest encompassing at least some of the one or more identified saturated pixels; and
capturing a second digital image of the target using the electronic array light sensor of the contact imager, the second digital image encompassing only the first region of interest, and the second digital image being captured with a shorter exposure time than the first digital image;
identifying one or more saturated pixels in the second digital image;
subdividing the first region of interest into one or more progressively smaller regions of interest; and
capturing one or more additional digital images of the one or more progressively smaller regions of interest using progressively smaller exposure times, until a digital image is obtained having no saturated pixels.

17. An imaging device, comprising:
a contact imager comprising an electronic array light sensor having a number of pixels; and
a controller programmed to control operation of the electronic array light sensor and to receive signals from the electronic array light sensor indicating an intensity of light falling respectively on the pixels of the electronic array light sensor, wherein the controller is programmed to:
capture a first digital image of an at least partially luminescent target using the electronic array light sensor of the contact imager;
identify one or more saturated pixels in the first digital image;
identify a first region of interest in the first digital image, the first region of interest encompassing the one or more identified saturated pixels; and
capture a second digital image of the target using the electronic array light sensor of the contact imager, the second digital image encompassing only the first region of interest, and the second digital image being captured with a shorter exposure time than the first digital image;
identify one or more saturated pixels in the second digital image;
identify a second region of interest encompassing at least some of the saturated pixels in the second digital image, the second region of interest being smaller than the first region of interest; and
capture a third digital image of the target using the electronic array light sensor, the third digital image encompassing only the second region of interest, and the third digital image being captured with a shorter exposure time than the second digital image.

18. The imaging device of claim 17, wherein the electronic array light sensor is a complementary metal oxide semiconductor (CMOS) sensor or a charged coupled device (CCD) sensor.

19. The imaging device of claim 17, wherein the controller is further programmed to construct a high dynamic range digital image of the target using at least the first digital image and the second digital image.

20. The imaging device of claim 17, wherein the electronic array light sensor comprises multiple taps.

* * * * *